US011333412B2

(12) United States Patent
Muthusubramanian

(10) Patent No.: US 11,333,412 B2
(45) Date of Patent: May 17, 2022

(54) CLIMATE-CONTROL SYSTEM WITH ABSORPTION CHILLER

(71) Applicant: Emerson Climate Technologies, Inc., Sidney, OH (US)

(72) Inventor: Kamalakkannan Muthusubramanian, Bangalore (IN)

(73) Assignee: Emerson Climate Technologies, Inc., Sidney, OH (US)

(*) Notice: Subject to any disclaimer, the term of this patent is extended or adjusted under 35 U.S.C. 154(b) by 33 days.

(21) Appl. No.: 16/811,657

(22) Filed: Mar. 6, 2020

(65) Prior Publication Data
US 2020/0326106 A1    Oct. 15, 2020

(30) Foreign Application Priority Data

Mar. 7, 2019   (IN) .............................. 201921008966

(51) Int. Cl.
*F25B 15/00*        (2006.01)
*F24F 5/00*         (2006.01)
(Continued)

(52) U.S. Cl.
CPC .......... *F25B 15/008* (2013.01); *F24F 5/0017* (2013.01); *F25B 17/00* (2013.01);
(Continued)

(58) Field of Classification Search
CPC .... F25B 15/008; F25B 17/00; B01D 53/1425; B01D 53/263; B01D 61/36; F24F 5/0017; Y02E 60/14
See application file for complete search history.

(56) References Cited

U.S. PATENT DOCUMENTS

| 2,446,988 A | 8/1948 | Flukes et al. |
| 3,073,843 A | 1/1963 | Buc |

(Continued)

FOREIGN PATENT DOCUMENTS

| CN | 2667391 Y | 12/2004 |
| CN | 101329098 A | 12/2008 |

(Continued)

OTHER PUBLICATIONS

Alfa Laval Kathabar, "Liquid desiccant dehumidification systems: Engineered solutions." https://www.alfalaval.com/globalassets/images/microsites/kathabar/alfa-laval-kathabar-liquid-desiccant-flyer.pdf (Nov. 1, 2017).

(Continued)

*Primary Examiner* — Lionel Nouketcha
(74) *Attorney, Agent, or Firm* — Harness, Dickey & Pierce, P.L.C.

(57) ABSTRACT

A climate-control system may include a first fluid circuit, a desiccant system, and a second fluid circuit. The first fluid circuit may include a desorber, an absorber, and an evaporator. A first fluid exits the desorber through a first outlet and flows through the evaporator and a first inlet of the absorber. A second fluid exits the desorber through a second outlet and may flow through a second inlet of the absorber. The desiccant system includes a conditioner and a regenerator. The conditioner includes a first desiccant flow path. The regenerator includes a second desiccant flow path in communication with the first desiccant flow path. The second fluid circuit circulates a third fluid that is fluidly isolated from the first and second fluids and desiccant in the desiccant system. The second fluid circuit may be in heat transfer relationships with the first fluid and the first desiccant flow path.

20 Claims, 3 Drawing Sheets

(51) Int. Cl.
  *F25B 17/00* (2006.01)
  *B01D 53/26* (2006.01)
  *B01D 53/14* (2006.01)
  *B01D 61/36* (2006.01)

(52) U.S. Cl.
  CPC ........ *B01D 53/1425* (2013.01); *B01D 53/263* (2013.01); *B01D 61/36* (2013.01); *Y02E 60/14* (2013.01)

(56) References Cited

U.S. PATENT DOCUMENTS

| | | | |
|---|---|---|---|
| 3,809,706 | A | 5/1974 | Magne et al. |
| 3,846,449 | A | 11/1974 | Magne et al. |
| 3,849,321 | A | 11/1974 | Magne et al. |
| 3,849,454 | A | 11/1974 | Magne et al. |
| 3,853,910 | A | 12/1974 | Freyermuth et al. |
| 3,873,457 | A | 3/1975 | Magne et al. |
| 4,205,529 | A | 6/1980 | Ko |
| 4,234,435 | A | 11/1980 | Meinhardt et al. |
| 4,397,750 | A | 8/1983 | Chibnik |
| 4,724,679 | A | 2/1988 | Radermacher |
| 4,769,454 | A | 9/1988 | Blank et al. |
| 4,987,750 | A * | 1/1991 | Meckler .................. F02G 1/043 62/238.6 |
| 5,041,622 | A | 8/1991 | LeSuer |
| 6,112,547 | A | 9/2000 | Spauschus et al. |
| 6,415,614 | B1 | 7/2002 | Greenfield et al. |
| 6,672,091 | B1 | 1/2004 | Lefor et al. |
| 7,159,407 | B2 | 1/2007 | Chen |
| 7,765,823 | B2 | 8/2010 | Shiflett et al. |
| 7,766,994 | B2 | 8/2010 | Matsuura |
| 7,841,208 | B2 | 11/2010 | Lefor |
| 8,490,427 | B2 | 7/2013 | Erickson |
| 8,785,357 | B2 | 7/2014 | Mosier et al. |
| 8,800,308 | B2 | 8/2014 | Vandermeulen et al. |
| 8,852,449 | B2 | 10/2014 | Carr et al. |
| 8,943,850 | B2 | 2/2015 | Vandermeulen et al. |
| 9,000,289 | B2 | 4/2015 | Vandermeulen et al. |
| 9,086,223 | B2 | 7/2015 | Vandermeulen et al. |
| 9,101,874 | B2 | 8/2015 | Vandermeulen |
| 9,101,875 | B2 | 8/2015 | Vandermeulen et al. |
| 9,243,810 | B2 | 1/2016 | Vandermeulen et al. |
| 9,273,877 | B2 | 3/2016 | Vandermeulen et al. |
| 9,308,490 | B2 | 4/2016 | Vandermeulen et al. |
| 9,377,207 | B2 | 6/2016 | Vandermeulen et al. |
| 9,429,332 | B2 | 8/2016 | Vandermeulen et al. |
| 9,470,426 | B2 | 10/2016 | Vandermeulen |
| 9,506,697 | B2 | 11/2016 | Vandermeulen |
| 9,631,823 | B2 | 4/2017 | Vandermeulen et al. |
| 9,631,848 | B2 | 4/2017 | Vandermeulen et al. |
| 9,709,285 | B2 | 7/2017 | Vandermeulen |
| 9,709,286 | B2 | 7/2017 | Vandermeulen et al. |
| 9,835,340 | B2 | 12/2017 | Vandermeulen et al. |
| 9,835,361 | B2 * | 12/2017 | El-Shaarawi ......... F25B 27/007 |
| 9,885,002 | B2 | 2/2018 | Rebrovic |
| 10,024,558 | B2 | 7/2018 | Vandermeulen |
| 10,024,601 | B2 | 7/2018 | Vandermeulen |
| 2003/0041608 | A1 * | 3/2003 | Gonzalez-Cruz ..... F25B 27/007 62/235.1 |
| 2009/0032222 | A1 | 2/2009 | Birbara et al. |
| 2011/0190180 | A1 | 8/2011 | Mosier et al. |
| 2012/0329689 | A1 | 12/2012 | Rebrovic et al. |
| 2014/0150481 | A1 | 6/2014 | Vandermeulen |
| 2017/0314825 | A1 | 11/2017 | Scancarello et al. |
| 2018/0259203 | A1 * | 9/2018 | Yin ...................... F24F 5/0014 |

FOREIGN PATENT DOCUMENTS

| | | |
|---|---|---|
| CN | 101486895 A | 7/2009 |
| CN | 101603746 A | 12/2009 |
| CN | 102679614 A | 9/2012 |
| CN | 103977683 A | 8/2014 |
| CN | 103994603 A | 8/2014 |
| CN | 103109138 B | 1/2016 |
| CN | 104508417 B | 3/2017 |
| CN | 105121979 B | 6/2017 |
| JP | S58156194 A | 9/1983 |
| JP | 2000257988 A | 9/2000 |
| JP | 2003075013 A | 3/2003 |
| JP | 5051689 B2 | 10/2012 |
| JP | 2014065923 A | 4/2014 |
| JP | 5911850 B2 | 4/2016 |
| JP | 6211644 B2 | 10/2017 |
| KR | 20040050388 A | 6/2004 |
| KR | 101154466 B1 | 6/2012 |
| KR | 20130071601 A | 7/2013 |
| KR | 101343466 B1 | 1/2014 |
| WO | WO-8800319 A1 | 1/1988 |
| WO | WO-2004015042 A2 | 2/2004 |
| WO | WO-2010008640 A1 | 1/2010 |
| WO | WO-2010034929 A1 | 4/2010 |
| WO | WO-2015034418 A1 | 3/2015 |

OTHER PUBLICATIONS

CHP Group of the Chartered Institution of Building Services Engineers, "Absorption Cooling." Datasheet 07, https://www.cibse.org/getmedia/5c9a9e15-5103-4b70-8aa1-1b7456fdf9a5/Datasheet-7-Absorption-Cooling.pdf (Feb. 2012).

Cuzuel, V. et al., "Amine Degradation in $CO_2$ Capture. 4. Development of complementary analytical strategies for a comprehensive identification of degradation compounds of MEA." International Journal of Greenhouse Gas Control, vol. 42, pp. 439-453 (Sep. 14, 2015).

7ac Technologies, Inc., "Our Solution." https://7actech.com/our-solution (2017).

Wujek, Scott S. et al., "Experimental and Modeling Improvements to a Co-Fluid Cycle Utilizing Ionic Liquids and Carbon Dioxide." Paper 1510, 15th International Refrigeration and Air Conditioning Conference at Purdue, School of Mechanical Engineering (Jul. 14-17, 2014).

International Search Report regarding International Application No. PCT/US2017/029928, dated Jul. 31, 2017.

Written Opinion of the International Searching Authority regarding International Application No. PCT/US2017/029928, dated Jul. 31, 2017.

International Search Report regarding International Application No. PCT/US2017/029915, dated Aug. 1, 2017.

Written Opinion of the International Searching Authority regarding International Application No. PCT/US2017/029915, dated Aug. 1, 2017.

Notice of Allowance regarding U.S. Appl. No. 15/496,268, dated Oct. 17, 2017.

Interview Summary regarding U.S. Appl. No. 15/496,268, dated Oct. 19, 2017.

Restriction Requirement regarding U.S. Appl. No. 15/496,237, dated Apr. 26, 2018.

Office Action regarding U.S. Appl. No. 15/496,237, dated Oct. 5, 2018.

Office Action regarding U.S. Appl. No. 15/496,237, dated Jan. 24, 2019.

Office Action regarding U.S. Appl. No. 15/496,237, dated Aug. 5, 2019.

Search Report regarding European Patent Application No. 17790456.2, dated Nov. 14, 2019.

Search Report regarding European Patent Application No. 17790460.4, dated Jan. 20, 2020.

Office Action regarding U.S. Appl. No. 15/496,237, dated Feb. 6, 2020.

Office Action regarding Chinese Patent Application No. 201780026500.4, dated Apr. 2, 2020. Translation provided by Unitalen Attorneys at Law.

U.S. Appl. No. 15/496,237, filed Apr. 25, 2017, Marc J. Scancarello et al.

Indian Office Action regarding Application No. 201921008966 dated Nov. 5, 2020.

(56) References Cited

OTHER PUBLICATIONS

International Search Report regarding International Application No. PCT/US2020/021397 dated Jul. 1, 2020.
Written Opinion of the ISA/KR regarding International Application No. PCT/US2020/021397 dated Jul. 1, 2020.

* cited by examiner

CLIMATE-CONTROL SYSTEM WITH ABSORPTION CHILLER

CROSS-REFERENCE TO RELATED APPLICATIONS

This application claims the benefit and priority of Indian Patent Application No. 201921008966, filed Mar. 7, 2019. The entire disclosure of the above application is incorporated herein by reference.

FIELD

The present disclosure relates to a climate-control system with an absorption chiller.

BACKGROUND

This section provides background information related to the present disclosure and is not necessarily prior art.

Conventional vapor-compression systems are often used to cool a space and reduce humidity within the space. While such systems have generally been effective means to cool a space and reduce humidity, there is a need for a system that provides more efficient cooling and humidity reduction over a wider range of operating conditions. The present disclosure provides such a system for more efficiently cooling a space and reducing humidity in the space.

SUMMARY

This section provides a general summary of the disclosure, and is not a comprehensive disclosure of its full scope or all of its features.

The present disclosure also provides a climate-control system that may include a first fluid circuit, a desiccant system, and a second fluid circuit. The first fluid circuit may include a desorber, an absorber, an evaporator disposed between the desorber and the absorber, and an expansion device disposed between the desorber and the evaporator. The desorber may include an inlet, a first outlet, and a second outlet. The absorber includes an outlet, a first inlet, and a second inlet. A first fluid may flow through the first outlet of the desorber, through the expansion device, through the evaporator, and through the first inlet of the absorber. A second fluid may exit the desorber through the second outlet of the desorber and flow through the second inlet of the absorber. The desiccant system may include a conditioner, a regenerator, a first conduit, and a fan. The first conduit extends between the conditioner and the regenerator and communicates a desiccant between the conditioner and the regenerator. The fan forces air across the conditioner such that the desiccant in the conditioner absorbs moisture (water) from the air. The second fluid circuit circulates a third fluid that is fluidly isolated from the first and second fluids in the first fluid circuit and the desiccant in the desiccant system. The second fluid circuit may include a coil that receives the third fluid and is in a heat transfer relationship with the first fluid in the evaporator.

In some configurations of the climate-control system of the above paragraph, the second fluid circuit includes a flow path that extends through the conditioner and receives the third fluid from the coil.

In some configurations of the climate-control system of either of the above paragraphs, the first conduit of the desiccant system partially defines a closed-loop liquid desiccant circuit.

In some configurations of the climate-control system of any one or more of the above paragraphs, the conditioner includes a desiccant flow path that is fluidly isolated from the flow path of the second fluid circuit.

In some configurations of the climate-control system of any one or more of the above paragraphs, the conditioner includes a membrane that is permeable to water and impermeable to liquid desiccant.

In some configurations of the climate-control system of any one or more of the above paragraphs, the second fluid circuit includes an air-handler coil disposed within an air handler.

In some configurations of the climate-control system of any one or more of the above paragraphs, the second fluid circuit includes a control valve in fluid communication with the air-handler coil and the flow path extending through the conditioner.

In some configurations of the climate-control system of any of the above paragraphs, the control valve is movable between a first position allowing fluid flow to the flow path and restricting fluid flow to the air-handler coil and a second position restricting fluid flow to the flow path and allowing fluid flow to the air-handler coil.

In some configurations of the climate-control system of any one or more of the above paragraphs, the first fluid is water.

In some configurations of the climate-control system of any one or more of the above paragraphs, the second fluid is an absorbent.

In some configurations of the climate-control system of any one or more of the above paragraphs, the third fluid is water.

In some configurations, the climate-control system of any one or more of the above paragraphs may include a heat source providing heat to the desorber and the regenerator.

In some configurations of the climate-control system of any one or more of the above paragraphs, the first fluid circuit includes a condenser disposed between the first outlet of the desorber and the expansion device.

In some configurations of the climate-control system of any one or more of the above paragraphs, the condenser is in a heat transfer relationship with a heat energy storage device.

The present disclosure also provides a climate-control system that may include a first fluid circuit, a desiccant system, and a second fluid circuit. The first fluid circuit may include a desorber, an absorber, and an evaporator disposed between the desorber and the absorber. A first fluid may exit the desorber through a first outlet of the desorber and may flow through the evaporator and a first inlet of the absorber. A second fluid may exit the desorber through a second outlet of the desorber and may flow through a second inlet of the absorber. The desiccant system may include a conditioner and a regenerator. The conditioner may include a first desiccant flow path. The regenerator may include a second desiccant flow path in communication with the first desiccant flow path. The second fluid circuit may circulate a third fluid that is fluidly isolated from the first and second fluids in the first fluid circuit and fluidly isolated from desiccant in the desiccant system. The second fluid circuit may be in a first heat transfer relationship with the first fluid in the evaporator and a second heat transfer relationship with the first desiccant flow path in the conditioner.

In some configurations of the climate-control system of the above paragraph, the second fluid circuit includes a fluid flow path that extends through the conditioner and is fluidly isolated from the first desiccant flow path.

In some configurations of the climate-control system of either of the above paragraphs, the conditioner includes a membrane that is permeable to water and impermeable to liquid desiccant. The membrane may at least partially define the first desiccant flow path.

In some configurations of the climate-control system of any of the above paragraphs, the first and second desiccant flow paths partially define a closed-loop liquid desiccant circuit.

In some configurations of the climate-control system of any one or more of the above paragraphs, the second fluid circuit includes an air-handler coil disposed within an air handler.

In some configurations of the climate-control system of any one or more of the above paragraphs, the second fluid circuit includes a control valve in fluid communication with the air-handler coil and the fluid flow path extending through the conditioner.

In some configurations of the climate-control system of any one or more of the above paragraphs, the control valve is movable between a first position allowing fluid flow to the fluid flow path and restricting fluid flow to the air-handler coil and a second position restricting fluid flow to the fluid flow path and allowing fluid flow to the air-handler coil.

In some configurations of the climate-control system of any one or more of the above paragraphs, the first fluid is water.

In some configurations of the climate-control system of any one or more of the above paragraphs, the second fluid is an absorbent.

In some configurations of the climate-control system of any one or more of the above paragraphs, the third fluid is water.

In some configurations, the climate-control system of any one or more of the above paragraphs may include a heat source providing heat to the desorber and the regenerator.

In some configurations of the climate-control system of any one or more of the above paragraphs, the first fluid circuit includes a condenser disposed between the first outlet of the desorber and the evaporator.

In some configurations of the climate-control system of any one or more of the above paragraphs, the condenser is in a heat transfer relationship with a heat energy storage device.

In some configurations of the climate-control system of any one or more of the above paragraphs, the desiccant system includes a fan that forces air across the conditioner such that the desiccant in the conditioner absorbs water from the air.

In some configurations of the climate-control system of any one or more of the above paragraphs, the desiccant system includes another fan that forces air across the regenerator such that water in the desiccant in the regenerator is transferred to air.

In some configurations of the climate-control system of any one or more of the above paragraphs, the desiccant system includes a first pump pumping desiccant from the conditioner to the regenerator and a second pump pumping desiccant from the regenerator to the conditioner.

In some configurations of the climate-control system of any one or more of the above paragraphs, the second fluid circuit includes a coil that receives the third fluid and is in a heat transfer relationship with the first fluid in the evaporator.

In some configurations of the climate-control system of any one or more of the above paragraphs, the conditioner includes a first conditioner inlet, a first conditioner outlet, a second conditioner inlet, and a second conditioner outlet.

In some configurations of the climate-control system of the above paragraph, the desiccant flows through the first conditioner inlet and the first conditioner outlet, and the third fluid flows through the second conditioner inlet and the second conditioner outlet.

The present disclosure provides a climate-control system that may include a first fluid circuit, a desiccant system, and a second fluid circuit. The first fluid circuit may include a condenser, an expansion device, and an evaporator. A first fluid flows through the condenser, the expansion device and the evaporator. The desiccant system may include a conditioner and a regenerator. The conditioner may include a first desiccant flow path. The regenerator may include a second desiccant flow path in communication with the first desiccant flow path. The second fluid circuit may be fluidly isolated from the first fluid in the first fluid circuit and may be fluidly isolated from desiccant in the desiccant system. The second fluid circuit may be in a first heat transfer relationship with the first fluid in the evaporator and a second heat transfer relationship with the first desiccant flow path in the conditioner.

In some configurations of the climate-control system of the above paragraph, the second fluid circuit includes a fluid flow path that extends through the conditioner and is fluidly isolated from the first desiccant flow path.

In some configurations of the climate-control system of either of the above paragraphs, the conditioner includes a membrane that is permeable to water and impermeable to liquid desiccant. The membrane may at least partially define the first desiccant flow path.

In some configurations of the climate-control system of any of the above paragraphs, the first and second desiccant flow paths partially define a closed-loop liquid desiccant circuit.

In some configurations of the climate-control system of either of the above paragraphs, the second fluid circuit includes an air-handler coil disposed within an air handler.

In some configurations of the climate-control system of any one or more of the above paragraphs, the second fluid circuit includes a control valve in fluid communication with the air-handler coil and the fluid flow path extending through the conditioner. The control valve may be movable between a first position allowing fluid flow to the fluid flow path and restricting fluid flow to the air-handler coil and a second position restricting fluid flow to the fluid flow path and allowing fluid flow to the air-handler coil.

In some configurations of the climate-control system of any one or more of the above paragraphs, the first fluid circuit may be an absorption cycle circuit including an absorber and a desorber. Alternatively, in other configurations of the climate-control system of any of the above paragraphs, the first fluid may be a refrigerant and the first fluid circuit may be a vapor-compression circuit including a compressor that circulates the first fluid through the condenser, the expansion device, and the evaporator.

The present disclosure also provides a climate-control system that may include a first fluid circuit, a desiccant system, and a tank. The first fluid circuit may include a condenser, an expansion device, an evaporator, and an absorber. Water may flow through the condenser, the expansion device, and the evaporator. The absorber may receive water from the evaporator. The desiccant system may include a conditioner having a desiccant flow path in which desiccant absorbs water from air. The tank may include a first inlet, a second inlet, a first outlet, a second outlet, a third outlet, and a fourth outlet. The first inlet may receive desiccant and water from the absorber. The second inlet may receive desiccant and water from the conditioner. The first outlet may provide water to the condenser. The second outlet may provide desiccant to the absorber. The third outlet may provide desiccant to the conditioner. The fourth outlet may vent water from tank.

In some configurations, the climate-control system of the above paragraph, may include a heat source configured to apply heat to the tank or otherwise heat the contents of the tank.

In some configurations, the climate-control system of either of the above paragraphs may include a first control valve controlling fluid flow through the fourth outlet.

In some configurations, the climate-control system of any one or more of the above paragraphs, may include a second fluid circuit that is fluidly isolated from the first fluid in the first fluid circuit and fluidly isolated from desiccant in the desiccant system. The second fluid circuit may be in a first heat transfer relationship with fluid in the evaporator and a second heat transfer relationship with the desiccant flow path in the conditioner.

In some configurations of the climate-control system of any one or more of the above paragraphs, the second fluid circuit includes an air-handler coil disposed within an air handler.

In some configurations of the climate-control system of any one or more of the above paragraphs, the second fluid circuit includes a second control valve in fluid communication with the air-handler coil and a fluid flow path extending through the conditioner. The second control valve may be movable between a first position allowing fluid flow to the fluid flow path and restricting fluid flow to the air-handler coil and a second position restricting fluid flow to the fluid flow path and allowing fluid flow to the air-handler coil.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
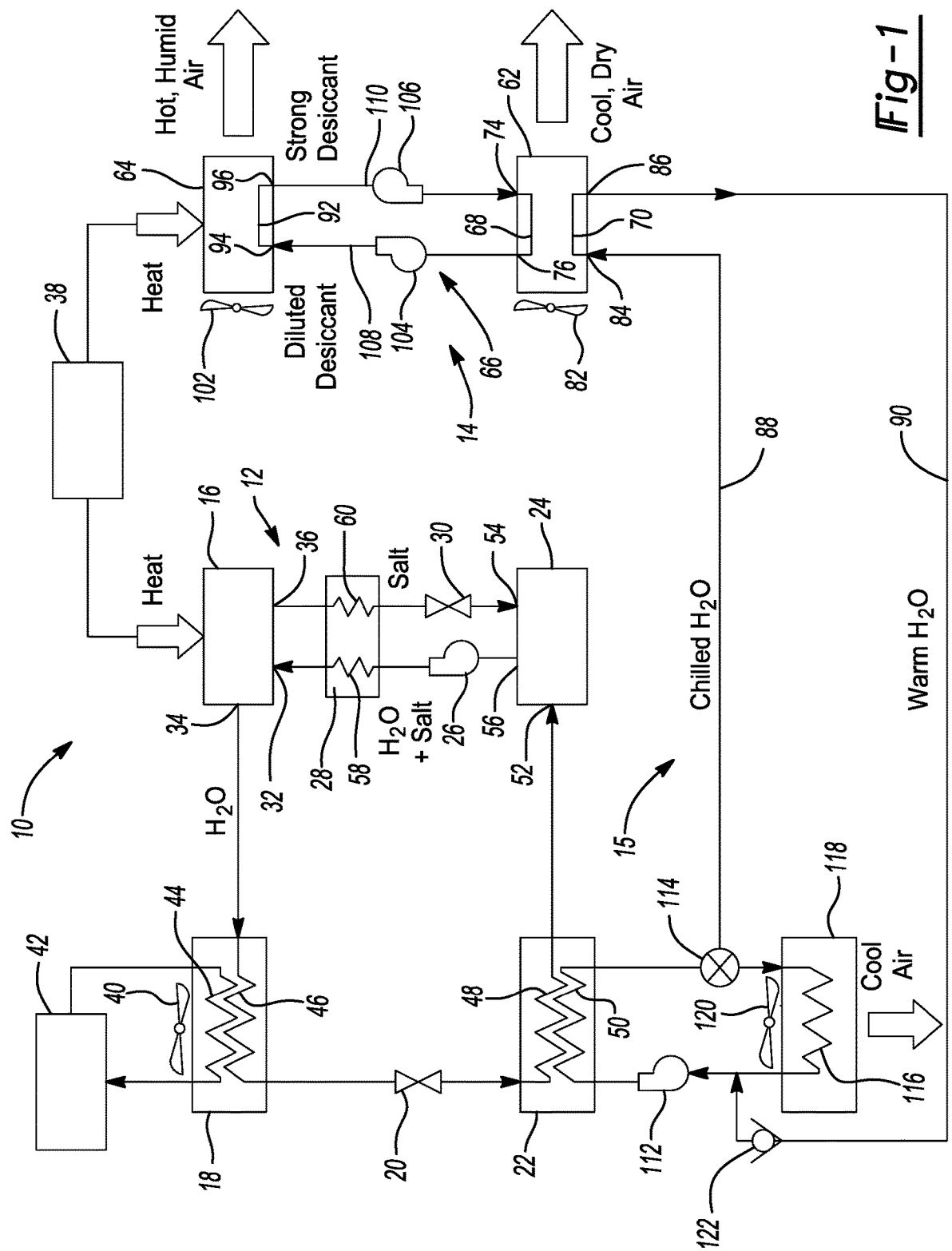
FIG. 1 is a schematic representation of a climate-control system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include an absorption cycle circuit 12

(e.g., an absorption chiller), a desiccant system 14, and a fluid circuit 15. As will be described in more detail below, the absorption cycle circuit 12 can cool a space (e.g., a room in a building or house, a refrigeration case, etc.) by removing sensible heat from the space, and the desiccant system 14 can remove humidity from the space. That is, the absorption cycle circuit 12 focusses primarily on the sensible load of the space and the desiccant system 14 focusses primarily on the latent load of the space. The climate-control system 10 effectively reduces sensible and latent heat in the space, may use less power than conventional vapor compression systems, and does not require the use of conventional refrigerants.

The absorption cycle circuit 12 may include a generator or desorber 16, a condenser 18, an expansion device 20, an evaporator 22, an absorber 24, a pump 26 (e.g., a centrifugal pump, a piston pump, a screw pump, rotary lobe pump, or any other type of pump), a heat exchanger 28, and a control valve 30 (e.g., a solenoid valve, stepper valve, or any other type of valve). The desorber 16 may be a tank or other vessel including an inlet 32, a first outlet 34, and a second outlet 36. The inlet 32 may receive a mixture (e.g., a solution) of a first fluid (e.g., a solvent) and a second fluid (e.g., a solute). The first fluid may be water or another refrigerant. The second fluid is an absorbent (e.g., a salt, such as lithium bromide, for example). That is, the mixture of the first and second fluids received through the inlet 32 may be a solution of the second fluid dissolved in the first fluid.

The desorber 16 may be heated (directly or indirectly) by a heat source 38 (e.g., a burner, boiler, solar heat, electric heat, steam, hot water, waste heat from another system or machine, and/or any other heat source). As heat is transferred to the mixture of the first and second fluids within the desorber 16, the first fluid desorbs from the second fluid so that the first fluid can separate from the second fluid. The first fluid may exit the desorber 16 through the first outlet 34, and the second fluid (or a high-concentration solution) may exit the desorber 16 through the second outlet 36.

The condenser 18 is a heat exchanger that receives the first fluid from the first outlet 34 of the desorber 16. Within the condenser 18, heat from the first fluid may be transferred to air, water, and/or some other medium. For example, a fan 40 may force air across the condenser 18 to cool the first fluid within the condenser 18. In some configurations, a heat energy storage device 42 may absorb heat from the first fluid in the condenser 18. The heat energy storage device 42 may include a conduit 44 in a heat transfer relationship with a coil 46 of the condenser 18. The conduit 44 may contain a fluid that absorbs heat from the first fluid in the coil 46. The heat energy storage device 42 may store heat energy absorbed by the fluid in the conduit 44 for use in another system.

The expansion device 20 may be an expansion valve (e.g., thermal expansion valve or electronic expansion valve) or a capillary tube, for example. The expansion device 20 may be in fluid communication with the condenser 18 and the evaporator 22. That is, the expansion device 20 may receive the first fluid from the condenser 18, and the evaporator 22 may receive the first fluid from the expansion device 20.

The evaporator 22 is a heat exchanger within which the first fluid may absorb heat from air or water, for example. For example, as shown in FIG. 1, the evaporator 22 may be in a heat transfer relationship with the fluid circuit 15. That is, a coil 48 of the evaporator 22 may be in a heat transfer relationship with a coil or conduit 50 of the fluid circuit 15 such that the first fluid in the coil 48 of the evaporator 22 absorbs heat from a third fluid (e.g., water or glycol) in the coil 50.

The absorber 24 may be a tank or other vessel including a first inlet 52, a second inlet 54, and an outlet 56. The first inlet 52 may receive the first fluid from the evaporator 22. The second inlet 54 may receive the second fluid from the control valve 30 (which may receive the second fluid from the second outlet 36 of the desorber 16). The first fluid may absorb into the second fluid within the absorber 24. In some configurations, a fan (not shown) may force air across the absorber 24 to cool the mixture of the first and second fluids and facilitate absorption of the first fluid into the second fluid.

The heat exchanger 28 may include a first coil 58 and a second coil 60. The pump 26 may force the mixture of the first and second fluids out of the outlet 56 of the absorber 24 and through the first coil 58. The second coil 60 receives the second fluid from the second outlet 36 of the desorber 16 before the second fluid flows through the control valve 30. The mixture of the first and second fluids in the first coil 58 may absorb heat from the second fluid in the second coil 60. The mixture of the first and second fluids may flow from the first coil 58 back into the desorber 16 via the inlet 32.

The desiccant system 14 may be a liquid desiccant system including a conditioner 62, a regenerator 64, and a closed-loop liquid desiccant circuit 66. For example, the desiccant system 14 may be similar or identical to desiccant systems described in any of U.S. Pat. Nos. 9,243,810, 9,631,848, or U.S. Pat. No. 10,024,601 owned by 7AC Technologies, Inc. A liquid desiccant (e.g., a salt or salt solution) may flow throughout the liquid desiccant circuit 66 and may absorb moisture (water) from the air of a space (e.g., a room of a home or building or some other climate-controlled space) to reduce humidity in the space.

Figure 2:
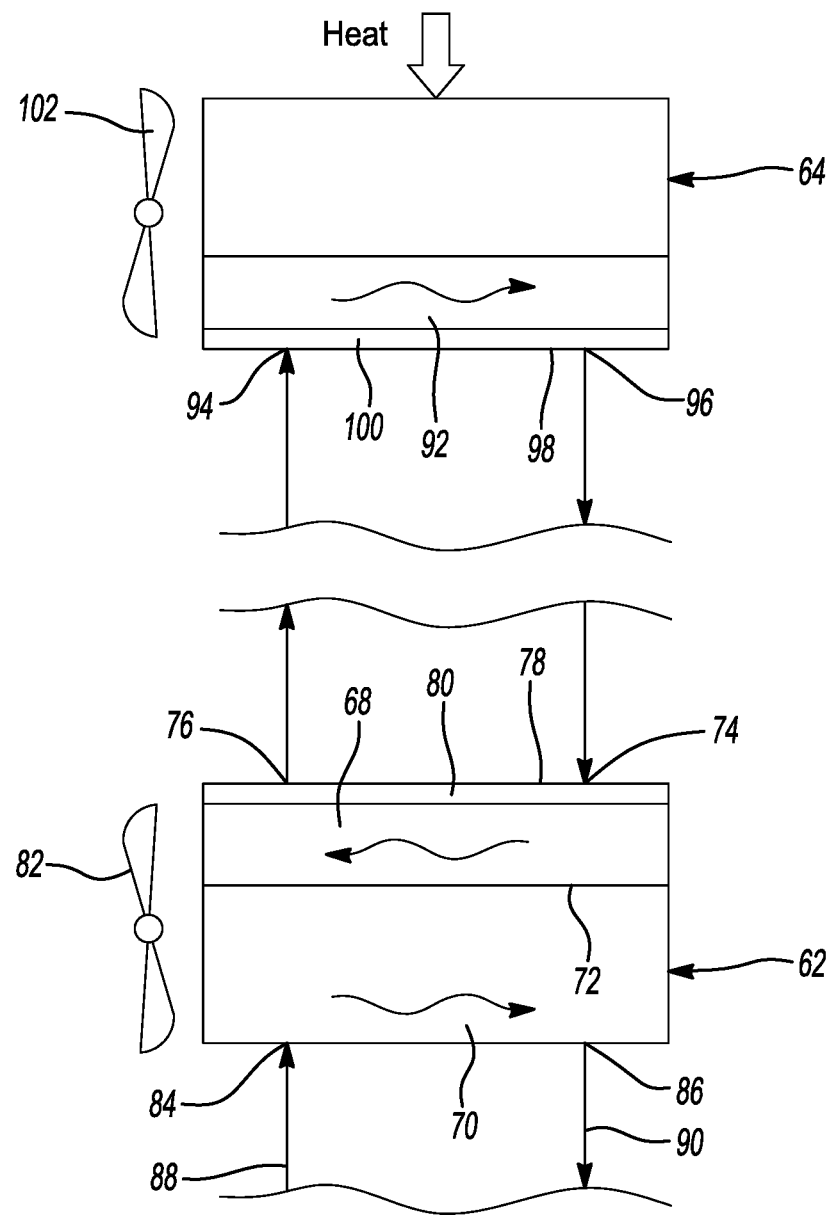
FIG. 2 is a schematic representation of a conditioner and a regenerator of the climate-control system of FIG. 1.

As shown in FIG. 2, the conditioner 62 may be a vessel having a first flow path 68 and a second flow path 70. An internal wall 72 fluidly separates the flow paths 68, 70 but allows heat transfer between the flow paths 68, 70. The first flow path 68 of the conditioner 62 is a part of the liquid desiccant circuit 66 and includes a desiccant inlet 74 and a desiccant outlet 76. As shown in FIG. 2, an outer wall 78 may include a membrane 80 that is permeable to water but impermeable to liquid desiccant flowing through the first flow path 68 and circulating throughout the liquid desiccant circuit 66. The membrane 80 may be a micro-porous membrane, and may be the EZ22090 polypropylene micro-porous membrane manufactured by Celgard, LLC, for example. Alternatively, the membrane 80 could be formed from other suitable materials. A fan 82 may force air across the conditioner 62 while the desiccant in the first flow path 68 of the conditioner 62 removes moisture (water) from the flow of air.

The second flow path 70 of the conditioner 62 may be a part of the fluid circuit 15 and includes an inlet 84 and an outlet 86. The inlet 84 may receive a chilled fluid (e.g., chilled water) from a first conduit 88 of the fluid circuit 15. The fluid from the first conduit 88 may flow through the second flow path 70 from the inlet 84 to the outlet 86. As the fluid flows through the second flow path 70, the fluid absorbs heat from the desiccant in the first flow path 68 and from the air that the fan 82 blows across the conditioner 62 (i.e., heat is transferred through the internal wall 72 from the first flow path 68 to the second flow path 70). Warmed fluid may exit the second flow path 70 through the outlet 86, which is coupled to a second conduit 90 of the fluid circuit 15.

As shown in FIG. 2, the regenerator 64 may be a vessel having a flow path 92. The flow path 92 of the regenerator 64 is a part of the liquid desiccant circuit 66 and includes a desiccant inlet 94 and a desiccant outlet 96. As shown in FIG. 2, an outer wall 98 may include a membrane 100 (like the membrane 80) that is permeable to water but impermeable to liquid desiccant flowing through the flow path 92. A fan 102 may force air (e.g., outdoor ambient air) across the regenerator 64. Water in the desiccant in the flow path 92 of the regenerator 64 is absorbed by the outdoor ambient air.

In some configurations, the heat source 38 (e.g., the same heat source that heats the desorber 16) may provide heat to the regenerator 64 to facilitate regeneration of the desiccant in the flow path 92. In some configurations, the regenerator 64 may include a hot water flow path that is fluidly isolate from the flow path 92 but transfers heat to the flow path 92. It will be appreciated that other heat sources could be utilized to facilitate desiccant regeneration.

As shown in FIG. 1, the liquid desiccant circuit 66 may also include a first pump 104 and a second pump 106 (e.g., centrifugal pumps, piston pumps, screw pumps, rotary lobe pumps, or any other type of pumps). The first pump 104 may be disposed along a first conduit 108 that connects the desiccant outlet 76 of the conditioner 62 with the desiccant inlet 94 of the regenerator 64. The second pump 106 may be disposed along a second conduit 110 that connects the desiccant outlet 96 of the regenerator 64 with the desiccant inlet 74 of the conditioner 62. While not specifically shown in FIG. 1, in some configurations, additional components (e.g., heat exchangers, tanks, valves, etc.) may be disposed along one or both of the first and second conduits 108, 110.

As described above, the desiccant in the first flow path 68 of the conditioner 62 absorbs moisture (water) and heat from the air forced across the conditioner 62 by the fan 82. The cool, dry air from the conditioner 62 may be directed into a space to be cooled (e.g., a room of a home or building or some other climate-controlled space). The first pump 104 may pump the diluted desiccant (i.e., desiccant that contains a relatively high amount of water) from the desiccant outlet 76 of the conditioner 62 to the desiccant inlet 94 of the regenerator 64. As described above, the water from the desiccant in the flow path 92 of the regenerator 64 is absorbed by the warm air forced across the regenerator 64 by the fan 102. The second pump 106 may pump the strong desiccant (i.e., desiccant that contains a relatively small amount of water) from the desiccant outlet 96 of the regenerator 64 to the desiccant inlet 74 of the conditioner 62. In some configurations, the liquid desiccant circuit 66 may include one or more heat exchangers in which heat is transferred from strong desiccant in the second conduit 110 to diluted desiccant in the first conduit 108.

The fluid circuit 15 may include the coil 50 (disposed in the evaporator 22), the first conduit 88, the second flow path 70 (disposed in the conditioner 62), the second conduit 90, a pump 112 (e.g., a centrifugal pump, a piston pump, a screw pump, rotary lobe pump, or any other type of pump), a control valve 114, and an air-handler coil 116. The pump 112 may pump the third fluid (e.g., water or glycol) throughout the fluid circuit 15.

As described above, heat from fluid in the coil 50 is absorbed by the first fluid in the coil 48 in the evaporator 22. From the coil 50, the chilled fluid may flow through the control valve 114. The control valve 114 may be movable between a first position that allows fluid to flow through the first conduit 88 to the conditioner 62 and restricts fluid flow to the air-handler coil 116 and a second position that allow fluid to flow through the air-handler coil 116 and restricts fluid flow to the first conduit 88 and conditioner 62. The control valve 114 may be moved to any one or more positions between the first and second positions to allow desired amounts of fluid flow to both the first conduit 88 and to the air-handler coil 116.

As described above, fluid from the first conduit 88 flows through the second flow path 70 of the conditioner 62 and absorbs heat from the desiccant in the first flow path 68. Warmed fluid exits the second flow path 70 and flows through the second conduit 90 and back to the coil 50.

Chilled fluid that flows through the air-handler coil 116 may absorb heat from air forced through an air handler 118 by a fan 120. Cooled air from the air handler 118 may be directed into a space to be cooled (e.g., a room of a home or building or some other climate-controlled space). Warmed fluid may flow from the air-handler coil 116 back to the coil 50. A check valve 122 may be disposed along the second conduit 90 to restrict or prevent fluid flow from the air-handler coil 116 into the second conduit 90.

It will be appreciated that in some configurations, the fluid circuit 15 could be constructed without either or both of the air-handler coil 116 and the control valve 114.

While the desiccant system 14 is described above as a closed-loop, liquid desiccant system, it will be appreciated that the system 10 could include other types of dehumidification systems (e.g., open-loop, direct contact, or indirect contact systems).

Figure 3:
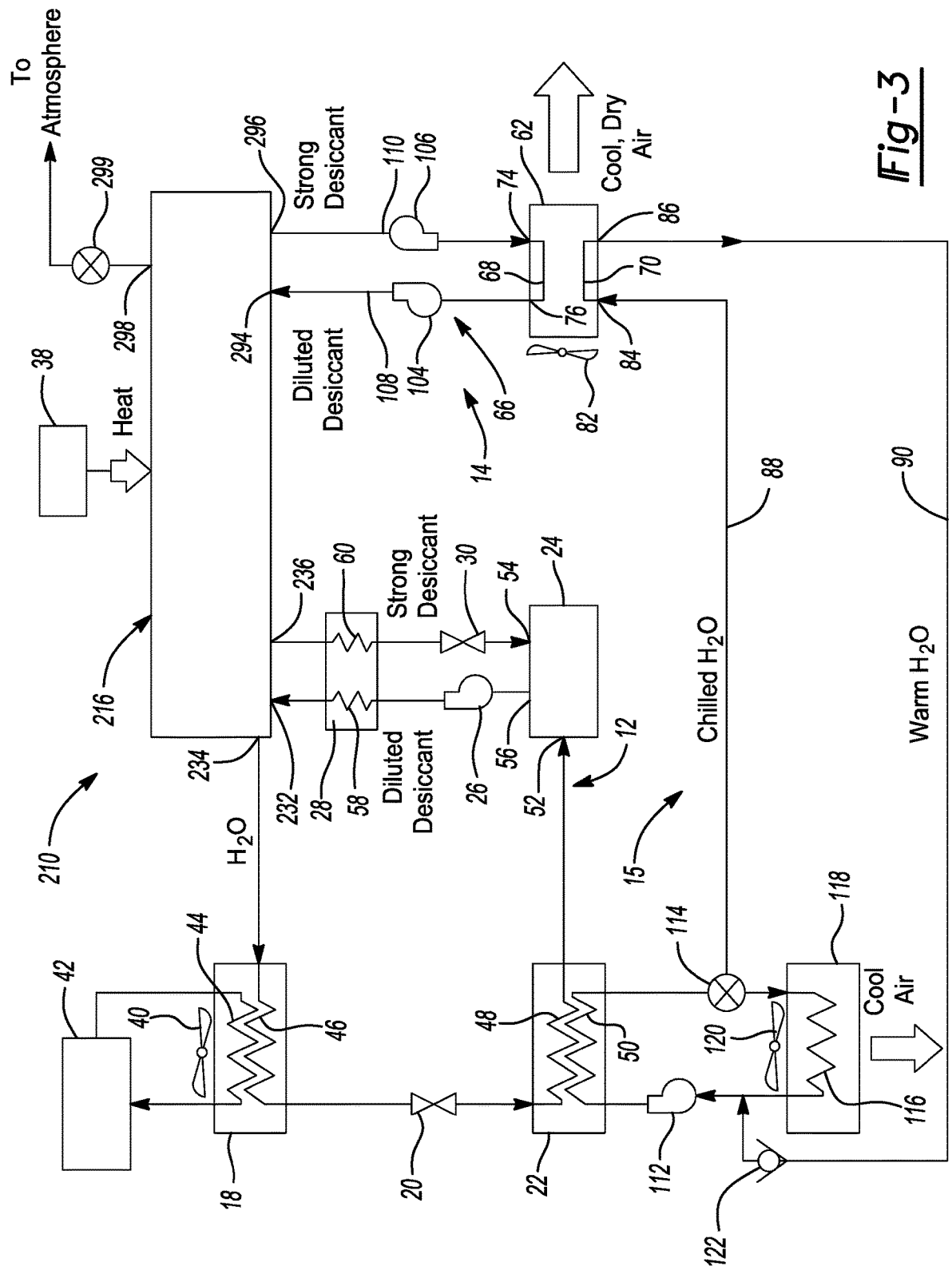
FIG. 3 is a schematic representation of another climate-control system according to the principles of the present disclosure.

With reference to FIG. 3, another climate-control system 210 is provided. The structure and function of the climate-control system 210 may be similar or identical to that of the climate-control system 10 described above, apart from exceptions described below. Therefore, similar features will not be described again in detail.

As shown in FIG. 3, the system 210 includes a vessel or tank 216 that replaces the desorber 16 and regenerator 64 of the system 10. The tank 216 is a unified component in that it functions as both a desorber for the absorption cycle circuit 12 and a regenerator for the desiccant system 14. The tank 216 may include a first inlet 232, a second inlet 294, a first outlet 234, a second outlet 236, a third outlet 296, and a fourth outlet 298. In the climate-control system 210, the absorption cycle circuit 12 and the desiccant system 14 circulate the same fluids. That is, the solution utilized in the absorption cycle circuit 12 comprises water and a desiccant, and the desiccant system 14 utilizes the same desiccant to remove humidity (water vapor) from the air in a space or room.

In the absorption cycle circuit 12 of the system 210, the pump 26 pumps diluted desiccant (a solution of water and desiccant) from the absorber 24, through the first coil 58 of the heat exchanger 28 and into the tank 216 through the first inlet 232. The heat source 38 heats the fluid within the tank 216, which causes the water vapor to separate from the solution of water and desiccant in the tank 216. Some of that separated water vapor may exit the tank 216 through the first outlet 234 and may flow through the coil 46 of the condenser 18, then through the expansion device 20 (as liquid water or as a mixture of liquid water and water vapor), through the coil 48 of the evaporator 22, and back into the absorber 24.

A portion of the strong desiccant in the tank 216 may exit the tank 216 through the second outlet 236 and may flow back to the absorber 24. Another portion of the strong desiccant in the tank 216 may exit the tank 216 through the third outlet 296 and may flow to the conditioner 62, where the desiccant absorbs humidity (water vapor) from the space or room (as described above) before returning to the tank 216 as diluted desiccant through the second inlet 294.

The water vapor brought into the tank 216 from the desiccant system 14 may be vented to the ambient atmosphere via the fourth outlet 298 of the tank 216. A control valve 299 (e.g., a solenoid or other electromechanical valve or a pressure-actuated mechanical valve) may be disposed at the first outlet 298 or in a conduit connected to the fourth outlet 298. The control valve 299 may be controlled to maintain a generally constant amount of water in the tank 216 (i.e., to maintain an appropriate amount of water for the absorption cycle circuit 12). That is, the control valve 299 may be controlled to vent an amount of water vapor from the tank 216 such that an appropriate amount of water is maintained in the tank 216 to allow efficient operation of the absorption cycle circuit 12.

While the fourth outlet 298 and control valve 299 are described above as venting water vapor to the ambient atmosphere, in some configurations of the system 210, water vapor from the fourth outlet 298 could be collected and used for some other purpose outside of the climate-control system 210. For example, the water vapor from the fourth outlet 298 could be condensed and collected for use in an irrigation system or a plumbing system (e.g., for bath water, toilet water, potable water, etc.).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
    a first fluid circuit including:
        a desorber,
        an absorber,
        an evaporator disposed between the desorber and the absorber, and
        an expansion device disposed between the desorber and the evaporator,
        wherein the desorber includes an inlet, a first outlet, and a second outlet,
        wherein the absorber includes an outlet, a first inlet, and a second inlet,
        wherein a first fluid flows through the first outlet of the desorber, through the expansion device, through the evaporator, and through the first inlet of the absorber,
        wherein a second fluid exits the desorber through the second outlet of the desorber and flows through the second inlet of the absorber;
    a desiccant system including:
        a conditioner,
        a regenerator,
        a first conduit, and
        a fan,
        wherein the first conduit extends between the conditioner and the regenerator and communicates a desiccant between the conditioner and the regenerator,
        wherein the fan forces air across the conditioner such that the desiccant in the conditioner absorbs water from the air; and
    a second fluid circuit circulating a third fluid that is fluidly isolated from the first and second fluids in the first fluid circuit and the desiccant in the desiccant system,
    wherein the second fluid circuit includes a coil that receives the third fluid and is in a heat transfer relationship with the first fluid in the evaporator, and
    wherein the conditioner includes a membrane that is permeable to water and impermeable to the desiccant in a liquid form.

2. The climate-control system of claim 1, wherein the first conduit of the desiccant system partially defines a closed-loop liquid desiccant circuit.

3. The climate-control system of claim 1, wherein the second fluid circuit includes a flow path that extends through the conditioner and receives the third fluid from the coil.

4. The climate-control system of claim 3, wherein the conditioner includes a desiccant flow path that is fluidly isolated from the flow path of the second fluid circuit.

5. The climate-control system of claim 3, wherein the second fluid circuit includes:
    an air-handler coil disposed within an air handler; and
    a control valve in fluid communication with the air-handler coil and the flow path extending through the conditioner,
    wherein the control valve is movable between a first position allowing fluid flow to the flow path and restricting fluid flow to the air-handler coil and a second position restricting fluid flow to the flow path and allowing fluid flow to the air-handler coil.

6. The climate-control system of claim 1, wherein the first fluid is water, the second fluid is an absorbent, and the third fluid is water.

7. The climate-control system of claim 1, further comprising a heat source providing heat to the desorber and the regenerator.

8. The climate-control system of claim 1, wherein the first fluid circuit includes a condenser disposed between the first outlet of the desorber and the expansion device, and wherein the condenser is in a heat transfer relationship with a heat energy storage device.

9. A climate-control system comprising:
    a first fluid circuit including:
        a desorber,
        an absorber,
        an evaporator disposed between the desorber and the absorber, and
        an expansion device disposed between the desorber and the evaporator,
        wherein the desorber includes an inlet, a first outlet, and a second outlet,
        wherein the absorber includes an outlet, a first inlet, and a second inlet,
        wherein a first fluid flows through the first outlet of the desorber, through the expansion device, through the evaporator, and through the first inlet of the absorber,
        wherein a second fluid exits the desorber through the second outlet of the desorber and flows through the second inlet of the absorber;
    a desiccant system including:
        a conditioner,
        a regenerator,
        a first conduit, and
        a fan,
        wherein the first conduit extends between the conditioner and the regenerator and communicates a desiccant between the conditioner and the regenerator,
        wherein the fan forces air across the conditioner such that the desiccant in the conditioner absorbs water from the air; and a second fluid circuit circulating a third fluid that is fluidly isolated from the first and second fluids in the first fluid circuit and the desiccant in the desiccant system, wherein the second fluid circuit includes a coil that receives the third fluid and is in a heat transfer relationship with the first fluid in the evaporator, wherein the second fluid circuit includes a flow path that extends through the conditioner and receives the third fluid from the coil, wherein the second fluid circuit includes:
an air-handler coil disposed within an air handler; and
a control valve in fluid communication with the air-handler coil and the flow path extending through the conditioner, wherein the control valve is movable between a first position allowing fluid flow to the flow path and restricting fluid flow to the air-handler coil and a second position restricting fluid flow to the flow path and allowing fluid flow to the air-handler coil.

10. The climate-control system of claim 9, wherein the conditioner includes a desiccant flow path that is fluidly isolated from the flow path of the second fluid circuit.

11. The climate-control system of claim 9, wherein the conditioner includes a membrane that is permeable to water and impermeable to the desiccant.

12. A climate-control system comprising:
a first fluid circuit including:
a desorber,
an absorber, and
an evaporator disposed between the desorber and the absorber,
wherein a first fluid exits the desorber through a first outlet of the desorber and flows through the evaporator and a first inlet of the absorber, and
wherein a second fluid exits the desorber through a second outlet of the desorber and flows through a second inlet of the absorber;
a desiccant system including:
a conditioner, and
a regenerator,
wherein the conditioner includes a first desiccant flow path, and
wherein the regenerator includes a second desiccant flow path in communication with the first desiccant flow path; and
a second fluid circuit circulating a third fluid that is fluidly isolated from the first and second fluids in the first fluid circuit and fluidly isolated from desiccant in the desiccant system,
wherein the second fluid circuit is in a first heat transfer relationship with the first fluid in the evaporator and a second heat transfer relationship with the first desiccant flow path in the conditioner,
wherein the second fluid circuit includes a fluid flow path that extends through the conditioner and is fluidly isolated from the first desiccant flow path, and
wherein the conditioner includes a membrane that is permeable to water and impermeable to the desiccant in a liquid form, and wherein the membrane at least partially defines the first desiccant flow path.

13. The climate-control system of claim 12, wherein the second fluid circuit includes:
an air-handler coil disposed within an air handler; and
a control valve in fluid communication with the air-handler coil and the fluid flow path extending through the conditioner,
wherein the control valve is movable between a first position allowing fluid flow to the fluid flow path and restricting fluid flow to the air-handler coil and a second position restricting fluid flow to the fluid flow path and allowing fluid flow to the air-handler coil.

14. The climate-control system of claim 12, wherein the first fluid is water, the second fluid is an absorbent, and the third fluid is water.

15. The climate-control system of claim 12, further comprising a heat source providing heat to the desorber and the regenerator.

16. The climate-control system of claim 12, wherein the first fluid circuit includes a condenser disposed between the first outlet of the desorber and the evaporator, and wherein the condenser is in a heat transfer relationship with a heat energy storage device.

17. The climate-control system of claim 12, wherein the conditioner includes a first conditioner inlet, a first conditioner outlet, a second conditioner inlet, and a second conditioner outlet, wherein the desiccant flows through the first conditioner inlet and the first conditioner outlet, wherein the third fluid flows through the second conditioner inlet and the second conditioner outlet.

18. The climate-control system of claim 12, wherein the desiccant system includes a fan that forces air across the conditioner such that the desiccant in the conditioner absorbs water from the air.

19. The climate-control system of claim 18, wherein the desiccant system includes another fan that forces air across the regenerator such that water in the desiccant in the regenerator is transferred to air.

20. The climate-control system of claim 12, wherein the second fluid circuit includes a coil that receives the third fluid and is in a heat transfer relationship with the first fluid in the evaporator.

* * * * *